P. BLAKELY.
STALK CUTTER.
APPLICATION FILED MAR. 28, 1912.

1,088,257.

Patented Feb. 24, 1914.

WITNESSES:

INVENTOR
Phylander Blakely
BY
ATTORNEY

UNITED STATES PATENT OFFICE.

PHYLANDER BLAKELY, OF RICHARDSON, TEXAS.

STALK-CUTTER.

1,088,257.  Specification of Letters Patent.  Patented Feb. 24, 1914.

Application filed March 28, 1912. Serial No. 686,738.

*To all whom it may concern:*

Be it known that I, PHYLANDER BLAKELY, a citizen of the United States, residing at Richardson, in the county of Dallas and State of Texas, have invented certain new and useful Improvements in Stalk-Cutters, of which the following is a specification.

My invention relates to new and useful improvements in stalk-cutters.

The object of my invention is to provide a stalk cutter which will break the stalks close to the ground.

Another object is to provide a stalk cutter which has no cutting edges to become dull and decrease the efficiency of the machine.

Still another object of my invention is to provide a machine of the character described which has a lever adjustment for raising and lowering the cutter to facilitate the breaking of the stalks.

Finally, the object of the invention is to provide a stalk cutter which will be simple, strong, durable, and efficient, and one which will not be likely to get out of working order.

Figure 1:
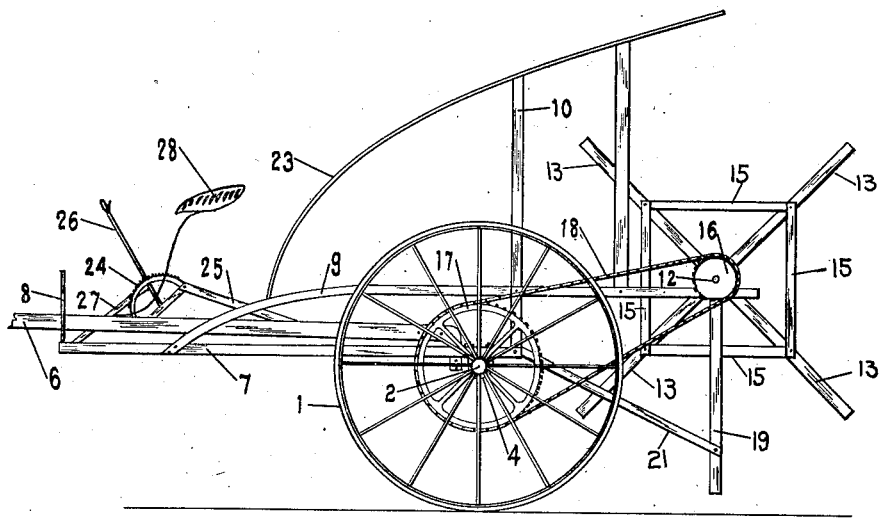
Figure 2:
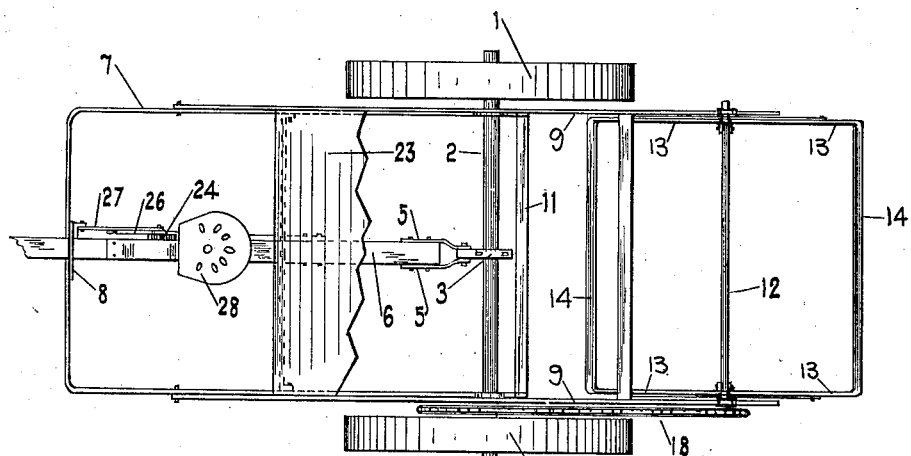

With these and various other objects in view, my invention has relation to certain novel features of the construction and operation, an example of which is described in the following specification, and illustrated in the accompanying drawings, wherein:

Figure 1 is a side elevation of the machine. Fig. 2 is a plan view of the same with a portion of the projecting hood broken away to show underlying parts.

Referring now more particularly to the drawings wherein like reference characters designate similar parts in all the figures, the numeral 1 denotes ground wheels which are mounted on an axle 2. In the center of this axle, a clamp 3, held in position by a U-shaped bolt 4, has connection through straps 5 with a tongue 6. A yoke 7 pivoted on the axle, extends forwardly therefrom and carries at its forward extremity a second yoke 8 arranged to engage over the tongue 6, the bars 9 having fixed connections at their forward ends with the yoke, extend behind the axle and are held above the yoke by vertical side bars 10, these side bars 10 being connected at their upper end by a horizontal bar 11, and form part of the support for a hood 23. On the rear end of the bars 9, a shaft 12, carrying a sprocket 16 on one end, is mounted to revolve. Power is transmitted to this shaft through a chain 18 from a sprocket 17 mounted on one of the ground wheels. On the shaft 12, radiating arms 13 are fixed at angles approximately 45 degrees. These arms are held in their respective positions by bars 15, and are made integral with these cutter blades or knockers 14 which parallel the shaft 12. Depending bars 19 support a horizontal cutter bar 20 at a point directly under the shaft 12. This bar is made integral with the bars 19, and the construction being the same as is used with the bars 13 and 14. The depending bars 19 have connection with the yoke 7 by links 21 at a point just above the cutter bar 20 and hold the same rigidly in position while the bars 14 revolve over the same, breaking the stalks by such action. A segment 24 supported on the tongue 6 and secured thereto by a bar 25, carries a bearing for a hand lever 26. A link 27 pivoted to this lever has connection with the forward end of the yoke 7, and is so arranged as to give a vertical movement to the same. The operator, through the use of the hand, may raise or lower the forward end of the yoke with relation to the tongue, and the yoke being arranged to rock on the axle, will communicate this movement to the revolving cutters. This is limited by the yoke 8 to prevent the bar 20 dragging, while the hood 23 prevents stalks, thrown by the revolving cutters, striking the operator, who occupies a seat 28 arranged in close proximity to the lever 26.

It is obvious that various changes in the forms and proportions of the parts of this invention may be made without departing from the spirit or sacrificing the advantages thereof, and the invention is therefore, presented as including all such changes and modifications as come within the scope of the following claim.

What I claim is:

In a device of the character described, an axle supported in ground wheels, a tongue having its rear end clamped to the center of the axle, a yoke having its rear end pivoted on the axle and extending forward under the tongue, a keeper secured to the forward end of the yoke and engaging over the tongue, a lever mounted on the tongue and having connection with the forward end of the yoke for swinging the same vertically, a frame rigidly attached to the yoke and extending rearwardly over the same to a point in rear of the axle, and a revolving implement mounted on the rear extremity of the frame.

In testimony whereof I have signed my name to this specification in the presence of two subscribing witnesses.

PHYLANDER BLAKELY.

Witnesses:
J. I. MURRAY,
D. C. RAMSEY.

Copies of this patent may be obtained for five cents each, by addressing the "Commissioner of Patents, Washington, D. C."